United States Patent
Kouzmina et al.

(10) Patent No.: US 9,720,157 B2
(45) Date of Patent: Aug. 1, 2017

(54) FLAME RETARDANT LIGHT DIFFUSING FIBER

(71) Applicant: CORNING INCORPORATED, Corning, NY (US)

(72) Inventors: Inna Igorevna Kouzmina, Corning, NY (US); Stephan Lvovich Logunov, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 322 days.

(21) Appl. No.: 13/975,699

(22) Filed: Aug. 26, 2013

(65) Prior Publication Data

US 2014/0063838 A1    Mar. 6, 2014

Related U.S. Application Data (60) Provisional application No. 61/695,634, filed on Aug. 31, 2012.

(51) Int. Cl.
- *F21V 8/00* (2006.01)
- *C09D 5/18* (2006.01)

(Continued)

(52) U.S. Cl.
CPC ........ *G02B 6/0005* (2013.01); *C03C 25/1065* (2013.01); *C08F 222/20* (2013.01);
(Continued)

(58) Field of Classification Search
CPC .. G02B 6/0003; G02B 6/001; G02B 6/02347; G02B 6/02366; G02B 6/02361; G02B 6/04; G02B 6/02; G02B 6/26; G02B 6/02295; G02B 6/02309; G02B 6/03627; G02B 6/03644; G02B 6/02395; G02B 6/0005; G02B 6/4436; G02B 6/02014;
(Continued)

(56) References Cited

U.S. PATENT DOCUMENTS

| | | |
|---|---|---|
| 4,608,409 A | 8/1986 | Coady et al. |
| 4,609,718 A | 9/1986 | Bishop et al. |

(Continued)

FOREIGN PATENT DOCUMENTS

JP    2001221935 A  *  8/2001

OTHER PUBLICATIONS

Mar. 7, 2014 International Search Report issued in counterpart application No. PCT/US2013/057243.

*Primary Examiner* — Hai Vo (57) ABSTRACT

This disclosure is directed to lighting diffusing fibers (LDFs) having a flame retardant coating thereon. The LDFs comprise a glass RAL fiber core having a primary polymer coating of a clear, colorless polymeric material having an index of refraction less than that of the glass fiber core and a flame retardant coating applied over the primary coating. The flame retardant coating consist of approximately 35-85 wt. % UV curable polymer forming monomers and 15-65 wt. % of an inorganic, halogen free filler, along with at least one photoinitiator and an antioxidant. In an embodiment phosphor-containing polymer layer can be applied between the primary coating and the flame retardant coating. In another embodiment the phosphor can be added to the flame retardant coating.

11 Claims, 3 Drawing Sheets

(51) Int. Cl.
*C03C 25/10* (2006.01)
*C09D 4/00* (2006.01)
*C08F 222/20* (2006.01)
*G02B 6/44* (2006.01)

(52) U.S. Cl.
CPC ............ *C09D 4/00* (2013.01); *C09D 5/18* (2013.01); *G02B 6/001* (2013.01); *G02B 6/4436* (2013.01)

(58) Field of Classification Search
CPC .............. G02B 6/02285; G02B 6/4482; C03C 25/1045; C03C 13/045; C03C 25/102; C03C 25/1065; C03C 25/106; C03C 25/1055; C03C 25/101; B29D 11/00; B82Y 30/00; C09D 4/06; C09D 4/00; C09D 5/18; C09D 133/14; C09D 175/16; C08F 290/06; C08F 222/20; Y10T 428/2938; Y10T 428/2982; Y10T 442/2893; Y10T 442/291; Y10T 442/2861; Y10T 442/2779; Y10T 442/2795; C08G 18/672; C08G 18/48; C08G 18/61; C08K 5/0041; C08K 5/07; C08K 5/10; C08K 5/5397; C08K 3/22; C08K 9/02; C01F 7/02; C01F 7/021; C09C 1/02; C09C 1/407; C09K 21/02; C01P 2002/88; C01P 2004/61; C01P 2004/62; C01P 2006/12; C01P 2006/14; C01P 2006/16; C01P 2006/19; C01P 2006/40; C01P 2006/80; H05K 1/0373; D06M 14/18; D06M 14/24; D06M 14/28; D06M 14/32; D06M 14/34; D06M 14/22; D06P 1/44; D06P 5/001; D06P 5/2005; Y10S 8/12
USPC ........ 524/437; 362/554, 558, 582; 264/1.29; 385/123, 31, 125, 126, 127, 128, 140, 385/114, 141; 65/402, 435; 522/83, 90, 522/91, 39, 64, 75, 81, 18, 96, 103
See application file for complete search history.

(56) References Cited

U.S. PATENT DOCUMENTS

| | | | |
|---|---|---|---|
| 6,498,883 B1 * | 12/2002 | Wilson | 385/114 |
| 6,775,451 B1 | 8/2004 | Botelho et al. | |
| 7,221,841 B2 | 5/2007 | Chase et al. | 385/128 |
| 7,542,645 B1 | 6/2009 | Hua et al. | 385/125 |
| 7,577,330 B2 | 8/2009 | Beshears et al. | 385/125 |
| 7,660,504 B2 | 2/2010 | Beshears et al. | 385/125 |
| 7,660,505 B2 | 2/2010 | Chase et al. | 385/128 |
| 8,545,076 B2 | 10/2013 | Bickham et al. | 362/558 |
| 8,591,087 B2 | 11/2013 | Bickham et al. | 362/558 |
| 8,929,703 B2 | 1/2015 | Logunov et al. | |
| 9,025,923 B2 | 5/2015 | Logunov et al. | |
| 2008/0045623 A1 * | 2/2008 | Yamaguchi et al. | 522/83 |
| 2009/0118410 A1 * | 5/2009 | Herbiet et al. | 524/437 |
| 2011/0122646 A1 | 5/2011 | Bickham et al. | |
| 2011/0144244 A1 * | 6/2011 | Lee | C08K 3/0058 524/84 |
| 2011/0300367 A1 | 12/2011 | Chien | |

* cited by examiner

FLAME RETARDANT LIGHT DIFFUSING FIBER

PRIORITY

This application claims the benefit of priority under 35 U.S.C. §119 of U.S. Provisional Application Ser. No. 61/695,634 filed on Aug. 31, 2012 the content of which is relied upon and incorporated herein by reference in its entirety.

FIELD

The disclosure is directed to a flame retardant light diffusing fiber for use in situations that require fire retardant lighting materials.

BACKGROUND

Light diffusing fiber (LDF) has been described in commonly owned U.S. Patent Application Publication No. 2001-0122646, *Optical Fiber Illumination Systems and Methods*. In certain applications of LDF, for example, in closed spaces for which an exit is difficult such as an airplane cabin, it is required that the light diffusing fiber have flame retardant properties. The typical LDF has glass core doped with RAL (random airline), a low index primary polymer coating, a standard secondary coating layer on top of the primary layer, and an additional scattering layer coating layer on the top of the secondary coating to produce additional light diffusing properties on the walls of the fiber. In some applications the fiber can have extra layer of phosphor coating to provide an additional color option. The flame retardant coating ("FRC") is applied as the last layer in existing LDF fibers; that is, after the application of the foregoing layers. However, the step of additionally providing this flame retardant layer on top of all the other layers adds complexity and costs to the manufacturing process. The present disclosure is directed to a LDF with flame retardant properties that does not entail the complexity and costs of standard FLDs while providing equivalent of better performance.

SUMMARY

This disclosure is directed to lighting diffusing fibers (LDFs) having a flame retardant coating thereon. The disclosed LDFs have several advantages over those known in the art. Such advantages include:

1. The replacement of the prior art's clear secondary coating plus white ink layer by a single layer flame retardant coating, FRC, that can include a white material such as aluminum trihydroxide or magnesium hydroxide simplifies the fiber making process. White ink acts as a scattering layer to provide uniform scattering in angular space (i.e. the same intensity is seen independent of viewing angle). In the present application the aluminum trihydroxide or magnesium oxide incorporated in the flame retardant coating serves as the "white ink."
2. The properties of the flame retardant coatings disclosed herein do not compromise optical attributes of the LDFs made using such coatings.
3. The outer diameter ("OD") of an LDF using the flame retardant coating disclosed herein can be thinner that the LDFs of the prior art.
4. Due to its low absorption, the flame retardant layer can be applied on top of phosphor coatings placed on an LDF, or the phosphor can be incorporated into the flame retardant coating.
5. The composition of the disclosed flame retardant coating material is novel and is compatible with fiber draw processes.

Thus, in one aspect the disclosure is directed to a flame retardant light diffusing fiber comprising a glass fiber core, the fiber being a RAL fiber having openings within; a primary clear, colorless polymeric coating/cladding over the glass fiber core, the primary coating having a lower refractive index than the fiber core, and a flame retardant polymer coating over the primary coating, the flame retardant coating consisting of 15-65 wt. % of an inorganic, halogen-free filler and 35-85 wt. % polymer, the flame retardant coating being an oligomer-free or substantially oligomer-free. In one embodiment the flame retardant polymer coating consists of 25-65 wt. % of an inorganic, halogen-free filler and 35-75 wt. % polymer. The inorganic halogen-free filler is selected from the group consisting of aluminum trihydroxide and magnesium hydroxide, the filler having a particle size in the range of 0.05 µm to 5 µm. In one embodiment the aluminum trihydroxide and/or magnesium hydroxide filler has a particle size in the range of 0.1 µm to 2 µm. The composition of the coating also includes at least one photoinitiator and at least one antioxidant.

In one embodiment the flame retarding polymeric coating is substantially oligomer-free, and the monomeric component includes an epoxy diacrylate monomer, an ethoxylated (4) bisphenol A diacrylate monomer, a propoxylated neopentyl glycol diacrylate monomer, and less than 3 wt. % polyether urethane acrylate oligomer.

In another embodiments the flame retarding polymeric coating is substantially oligomer-free, and the monomeric component includes an epoxy diacrylate monomer, an ethoxylated (4) bisphenol A diacrylate monomer, a tripropylene glycol diacrylate monomer, and less than 3 wt. % polyether urethane acrylate oligomer.

In further embodiments the flame retarding polymeric coating is substantially oligomer-free, and the monomeric component includes an epoxy diacrylate monomer, an ethoxylated (4) bisphenol A diacrylate monomer, an ethoxylated (10) bisphenol A diacrylate monomer, a tripropylene glycol diacrylate monomer, and an acidic polymeric ester for example, TrPGDA or (PO)NPGDA, or mixture of thereof.

In an embodiment the fiber further comprises a phosphor layer between the primary layer and the flame retarding layer. In another embodiment the flame retarding polymeric coating further comprises a phosphor and enables the application of a phosphor-containing flame retardant coating layer.

In another aspect the disclosure is directed to a method for making a flame retardant light diffusing fiber, the method comprising the steps of:

providing a glass optical core, the fiber being a RAL fiber having openings therein;

providing a clear, colorless primary polymer coating material having an index of refraction that is less than the index of refraction of the glass fiber core and coating the fiber core with the polymer coating;

providing a clear, colorless flame retardant polymer forming coating material consisting of 20-60 wt. % of an inorganic, halogen-free filler, 40-80 wt. % polymer forming monomers, at least one photoinitiator and an antioxidant, the flame retardant coating material being an oligomer-free or substantially oligomer-free, wherein the monomers are at least two different polymer forming monomers;

overcoating the primary coating with the flame retardant polymer coating material containing the inorganic, halogen-free filler;

and curing the flame retardant polymer material using UV radiation to thereby form a light diffusing fiber having a cured flame retardant coating thereon. In the method the provided inorganic halogen-free filler is selected from the group consisting of aluminum trihydroxide and magnesium hydroxide, said filler having a particle size in the range of 0.05 μm to 5 μm. In one embodiment the provided inorganic halogen-free filler is selected from the group consisting of aluminum trihydroxide and magnesium hydroxide, said filler having a particle size in the range of 0.1 μm to 2 μm. In one embodiment the flame retarding polymeric coating is substantially oligomer-free, and the monomeric component includes an epoxy diacrylate monomer, ethoxylated (4) bisphenol A diacrylate monomer, propoxylated neopentyl glycol diacrylate monomer, and less than 3 wt. % polyether urethane acrylate oligomer.

In another embodiment the flame retarding polymeric coating is substantially oligomer-free, and the monomeric component includes an epoxy diacrylate monomer, ethoxylated (4) bisphenol A diacrylate monomer, tripropylene glycol diacrylate monomer, and less than 3 wt. % polyether urethane acrylate oligomer In further embodiments the flame retarding polymeric coating is substantially oligomer-free, and the monomeric component includes epoxy diacrylate monomer, ethoxylated (4) bisphenol A diacrylate monomer, ethoxylated (10) Bisphenol A diacrylate monomer, tripropylene glycol diacrylate monomer, and acidic polymeric ester TrPGDA or (PO) NPGDA, or mixture of thereof.

In an embodiment the method a comprises the step of providing a phosphor layer between the primary layer and the flame retarding layer. In another embodiment the clear, colorless flame retardant polymer forming coating material further comprises a phosphor dispersed in the polymer forming coating material to thereby enable the application of a phosphor-containing, flame retardant coating layer in a single step.

DETAILED DESCRIPTION

Reference is now made in detail to the present preferred embodiments of the disclosure, examples of which are illustrated in the accompanying drawings. Whenever possible, like or similar reference numerals are used throughout the drawings to refer to like or similar parts. It should be understood that the embodiments disclosed herein are merely examples, each incorporating certain benefits of the present invention.

Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

Herein the term "RAL" (random airline) is a term of art and refers to an optical fiber having a glass core with openings or holes within the core and a low refractive index polymeric coating over the core glass fiber. The term RAL can also defined as nanostructures filled with selected gas in a glass material.

In LDF applications it is highly desirous to use flame retarding coatings that are free or substantially free of oligomeric materials to reduce the costs and complexity of the manufacturing process. The present disclosure is directed to a new flame retardant coating that is free or substantially free of the oligomers. Herein the term "substantially free" means that the coating as prepared and applied to the fiber contains less then 3% by weight (wt. %) of an oligomeric compound used in the starting coating composition. In one embodiment the amount of oligomeric material is less than 2 wt. %. In a further embodiment the amount of oligomeric material is less than 1 wt. %

The term oligomer is defined as the class of compounds including aliphatic and aromatic urethane (meth)acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers.

As indicated above, a minor constituent of the coating composition of the present invention is an optional oligomeric component. The oligomeric component can include a single type of oligomer or it can be a combination of two or more oligomers. When employed, if at all, the oligomeric component introduced into the compositions of the present invention preferably includes ethylenically unsaturated oligomers. The oligomeric component can be present preferably in an amount of about 3 weight percent or less. While maintaining suitable physical characteristics of the composition and its resulting cured material, it is more cost-effective and, therefore, desirable to prepare compositions containing more preferably less than about 2 weight percent, and even more preferably less than about 1 weight percent of the oligomeric component. Most preferably, the present invention relates to a secondary coating composition for optical fibers free of an oligomeric component.

When employed, suitable oligomers can be either monofunctional oligomers or polyfunctional oligomers, although polyfunctional oligomers are preferred. The oligomeric component can also be a combination of a monofunctional oligomer and a polyfunctional oligomer. Di-functional oligomers preferably have a structure according to formula (I) below:

$$F_1—R_1\text{-[Diisocyanate-}R_2\text{-Diisocyanate]}_m—R_1—F_1 \quad (I)$$

where $F_1$ is independently a reactive functional group such as acrylate, methacrylate, acrylamide, N-vinyl amide, styrene, vinyl ether, vinyl ester, or other functional group known in the art; $R_1$ includes, independently, $-C_{2-12}O-$, $-(C_{2-4}-O)_n-$, $-C_{2-12}O-(C_{2-4}-O)_n-$, $-C_{2-12}O-(CO-C_{2-5}O)_n-$, or $-C_{2-12}O-(CO-C_{2-5}NH)_n-$ where n is a whole number from 1 to 30, preferably 1 to 10; $R_2$ is polyether, polyester, polycarbonate, polyamide, polyurethane, polyurea, or combinations thereof; and m is a whole number from 1 to 10, preferably 1 to 5. In the structure of formula I, the diisocyanate group is the reaction product formed following bonding of a diisocyanate to $R_2$ and/or $R_1$. The term "independently" is used herein to indicate that each $F_1$ may differ from another $F_1$ and the same is true for each $R_1$.

Other polyfunctional oligomers preferably have a structure according to formula (II), formula (III), or formula (IV) as set forth below:

multiisocyanate-($_2$—$R_1$—$F_2$)$_x$ (II)

polyol-[(diisocyanate-$R_2$-diisocyanate)$_m$-$R_1$—$F_2$]$_x$ (III)

or multiisocyanate-($R_1$—$F_2$)$_x$ (IV)

where $F_2$ independently represents from 1 to 3 functional groups such as acrylate, methacrylate, acrylamide, N-vinyl amide, styrene, vinyl ether, vinyl ester, or other functional groups known in the art; $R_1$ can include $-C_{2-12}O-$, $-(C_{2-4}-O)_n-$, $-C_{2-12}O-(C_{2-4}-O)_n-$, $-C_{2-12}O-(CO-C_{2-5}O)_n-$, or $-C_{2-12}O-(CO-C_{2-5}NH)_n-$; where n is a whole number from 1 to 10, preferably 1 to 5; $R_2$ can be polyether, polyester, polycarbonate, polyamide, polyurethane, polyurea or combinations thereof; x is a whole number from 1 to 10, preferably 2 to 5; and m is a whole number from 1 to 10, preferably 1 to 5.

In the structure of formula II, the multiisocyanate group is the reaction product formed following bonding of a multiisocyanate to $R_2$. Similarly, the diisocyanate group in the structure of formula III is the reaction product formed following bonding of a diisocyanate to $R_2$ and/or $R_1$.

Urethane oligomers are conventionally provided by reacting an aliphatic or aromatic diisocyanate with a dihydric polyether or polyester, most typically a polyoxyalkylene glycol such as a polyethylene glycol. Such oligomers typically have between about four to about ten urethane groups and may be of high molecular weight, e.g., 2000-8000. However, lower molecular weight oligomers, having molecular weights in the 500-2000 range, may also be used. U.S. Pat. No. 4,608,409 to Coady et al. and U.S. Pat. No. 4,609,718 to Bishop et al., which are hereby incorporated by reference, describe such syntheses in detail.

When it is desirable to employ moisture-resistant oligomers, they may be synthesized in an analogous manner, except that the polar polyether or polyester glycols are avoided in favor of predominantly saturated and predominantly non-polar aliphatic diols. These diols include, for example, alkane or alkylene diols of from about 2-250 carbon atoms and, preferably, are substantially free of ether or ester groups.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

In contrast to the art, the FRC coatings disclosed herein are formed from a combination of two or more monomeric starting materials that are cured in situ on the fiber. Preferably the coating contain a photoinitiator and an antioxidant and are cured using UV radiation. Preferably, the compositions are free or substantially free of an oligomeric component, and the monomeric component is a combination of two or more monomers.

The flame retardant material or component of this disclosure may also comprise at least one inorganic, halogen-free flame retardant filler selected from a group including, but not limited to, aluminum trihydroxide (ATH, $Al(OH)_3$), magnesium hydroxide ($Mg(OH)_2$) and mixtures thereof. The term halogen-free, as used herein, means that the amount of halogen in the flame retardant coating material is an amount of less than 5 wt. %, preferably less than 3 wt. %, and more preferably less than 1 wt. %. Compared to other inorganic fillers such as calcium carbonate and titanium dioxide which hinder curing by absorbing UV light and quenching certain radical reactions, ATH and magnesium hydroxide are UV-transparent, making it possible to achieve higher filler loadings in UV curable formulations without impeding both the rate of cure and the degree of cure, thus enabling high speed fiber processing. Compared to other flame retardants such as compounds based on organic phosphorous as a flame retardant material, ATH and magnesium hydroxide do not have the high costs and/or problematic environmental impact for example, eutrophication in rivers and lakes after hydrolysis, and in addition, are non-toxic and non-corrosive. Moreover, unlike with ATH and magnesium hydroxide, phosphorus containing flame retardants exhibit high moisture absorption which may lead to decomposition, and thus may risk the long time reliability of the optical fiber. A related application is U.S. Provisional Patent Application No. 61/652,538 titled "*Secondary Coating Compositions for Optical Fibers*" filed on May 20, 2012.

Embodiments of the composition may include a flame retardant component present in an amount of 20 weight percent or more, and more preferably in an amount of about 25 to about 60 weight percent. Embodiments of the FRC compositions may contain flame-retardant fillers having a particle size ranging from about 0.05 μm to about 5 μm, and more preferably from about 0.1 μm to about 2 μm. ATH is commercially available (for example under the trade names of SpaceRite® S3 and SpaceRite® S11 from Almatis Corporation, Frankfurt, Germany), and magnesium hydroxide is also commercially available (for example, from Martin Marietta Magnesia Specialties, Baltimore, Md., under the trade names of MagShield® S and MagShield® UF).

The flame retardant inorganic fillers may also be surface modified. The surface modifications are particularly useful in aiding processing by reducing polymer viscosity, achieving higher filler loadings, enhancing interfacial adhesion between the filler particles and resin, shortening gel time, enhancing mechanical properties such as improved tensile, flexural, impact or elongation strength allowing for a thinner multilayer intermediate coating layer, increasing resistance to water permeation and reducing the tendency for blushing. A wide selection of chemical modifications of the flame retardant inorganic fillers can be carried out with surfactants, organofunctional silanes, and saturated or unsaturated fatty acids containing 8 to 24 carbon atoms, or metal salts thereof. Embodiments of the composition may include a flame retardant component comprising amino silane, vinyl silane or epoxy silane surface treated ATH and/or magnesium hydroxide having a particle size in the range of 0.25 to 1 micron. Surface treated ATH suitable for embodiments of the composition may be obtained from Almatis under the trade names of Hydral® 6581, Hydral® 6582, Hydral® 6583 and Hydral® 6584. Magnesium hydroxide suitable for use in embodiments of the composition may be obtained from Martin Marietta Magnesia Specialties under the trade names of MagShield® S and MagShield® UF. Untreated magnesium hydroxide is sold the under MagShield® S and MagShield® UF trade name and carry an additional designation. For example, stearate-coated magnesium hydroxide is designated MagShield® S-NB10 (NB10 being the additional designation).

Listed below are the compositions and properties of several flame retardant coatings that are oligomer free or substantially oligomer free. The composition of Comparative Example A is a commercial oligomer-containing coating without a flame retardant component as disclosed in U.S. Pat. No. 6,775,451. Photomer® 3016 is a commercially available epoxy diacrylate monomer (IGM Resins Inc.), Photomer® 4028 is ethoxylated (4) bisphenol diacrylate monomer (IGM Resins Inc), SR601 is ethoxylated (4) bisphenol A monomer and SR9003 is a propoxylated neopentyl glycol diacrylate monomer, both of which are available from Sartomer USA, Exton Pa. TPO photoinitiator is commercially available from BASF Resins Paint & Coatings.

The compositions of Examples 1-8 were prepared with the listed components using commercial blending equipment. The components were weighed and then introduced into a heated kettle and blended together at a temperature within the range of from about 50° C. to 70° C. Blending was continued until a homogenous mixture was obtained.

After thoroughly blending, the compositions were examined under an optical microscope for the presence of agglomerates and tested for viscosity, cure speed and mechanical properties.

Listing of Materials

Photomer 3016 epoxy diacrylate monomer and Photomer 4028 ethoxylated (4) bisphenol A monomer are available from IGM Resins. SR601 ethoxylated (4) bisphenol A monomer, SR602 ethoxylated (10) bisphenol diacrylate monomer, SR306 tripropylene glycol diacrylate and SR9003 propoxylated neopentyl glycol diacrylate monomer are available from Sartomer USA, Exton, Pa. TPO (diphenyl (2,4,6-trimethylbenzoyl)-phosphine oxide photoinitiator, Irgacure® 184 photoinitiator and Irganox® 1035 antioxidant are available from BASF Resins Paint & Coatings, KWS 4131 is a polyether urethane acrylate oligomer is available from Bomar Specialty Co., Winstead, Conn. TrPGDA, tripropylene glycol diacrylate, and (PO)NPGDA, propoxylated neopentyl glycol diacrylate, using in making some dispersions are commercially available. The antioxidant such as Irganox® 1035 is added as parts per hundred (pph) based on the total weight of the batched composition.

The following are mixtures prepared by applicants and used in the making of the FRCs disclosed herein:

A. 9W1266: is a dispersion of 65 wt. % SpaceRite S3 ATH/35 wt. % (PO)NPGDA.

B. 9C1235 is a dispersion of 55 wt. % MagShield UF Mg(OH)$_2$/45 wt., % TrPGDA.

C. 9Z1305 is a dispersion of 45 wt. % Hydral 6581 ATH in _ wt. % SR602, _ wt. % SR306 and _ wt. % acidic polymeric ester TrPGDA or (PO)NPGDA, or mixture.

D. 9Z1325 is a dispersion of 45 wt. % Hydral 6581 ATH in SR602, SR306 and acidic polymeric ester TrPGDA or (PO)NPGDA, or mixture.

E. 9Z1317 is a dispersion of 45 wt. % Hydral 6584 ATH in SR602, SR306, and acidic polymeric ester TrPGDA or (PO)NPGDA, or mixture thereof.

Comparative Example A

Commercial oligomer-containing secondary coating composition without a flame retardant as disclosed in U.S. Pat. No. 6,775,451.

Example 1—Control for Example 3

| | |
|---|---|
| KWS4131 oligomer | 3.88 wt. % |
| Photomer 3016 epoxy diacrylate monomer | 1.94 wt. % |
| SR601/Photomer 4028 ethoxylated (4) bisphenol A monomer) | 31.82 wt. % |
| SR9003 propoxylated neopentyl glycol diacrylate monomer | 56.80 wt. % |
| TPO photoinitiator | 2.78 wt. % |
| Irgacure184 photoinitiator | 2.78 wt. % |
| Irganox1035 antioxidant | 0.2 pph |

Example 2—Substantially Oligomer Free Composition with a Flame Retardant

| | |
|---|---|
| 9W1226 | 77.6 wt. % |
| KWS4131 oligomer | 2.00 wt. % |
| Photomer 3016 epoxy diacrylate monomer | 1.00 wt. % |
| SR601/Photomer 4028 ethoxylated (4) bisphenol A monomer | 16.40 wt. % |
| TPO photoinitiator | 1.50 wt. % |
| Irgacure184 photoinitiator | 1.50 wt. % |
| Irganox1035 antioxidant | 0.1 pph |

Example 3—Substantially Oligomer Free Composition with a Flame Retardant

| | |
|---|---|
| Hydral 6584 ATH (1 μm) | 46.0 wt. % |
| KWS4131 oligomer | 2.10 wt. % |
| Photomer 3016 epoxy diacrylate monomer (IGM Resins Inc.) | 1.05 wt. % |
| SR601/Photomer 4028 ethoxylated (4) bisphenol A monomer | 17.18 wt. % |
| SR9003 propoxylated neopentyl glycol diacrylate monomer | 30.67 wt. % |
| TPO photoinitiator | 1.50 wt. % |
| Irgacure184 photoinitiator | 1.50 wt. % |
| Irganox1035 antioxidant | 0.1 pph |

Example 4—Substantially Oligomer Free Composition with a Flame Retardant

| | |
|---|---|
| 9C1235 | 80.76 wt. % |
| KWS4131 oligomer | 1.67 wt. % |
| Photomer 3016 epoxy diacrylate monomer | 0.84 wt. % |
| SR601/Photomer 4028 ethoxylated (4) bisphenol A monomer | 13.73 wt. % |
| TPO photoinitiator | 1.50 wt. % |
| Irgacure184 photoinitiator | 1.50 wt. % |
| Irganox1035 antioxidant | 0.08 pph |

Example 5—Oligomer Free Composition with a Flame Retardant

| | |
|---|---|
| 9Z1305 | 55.50 wt. % |
| Photomer 3016 epoxy diacrylate monomer | 5.80 wt. % |
| SR601/Photomer 4028 ethoxylated (4) bisphenol A monomer | 36.60 wt. % |
| TPO photoinitiator | 1.05 wt. % |
| Irgacure184 photoinitiator | 1.05 wt. % |
| Irganox1035 antioxidant | 0.38 pph |

Example 6—Oligomer Free Composition with a Flame Retardant

| | |
|---|---|
| 9Z1325 | 55.50 wt. % |
| Photomer 3016 epoxy diacrylate monomer | 5.80 wt. % |
| SR601/Photomer 4028 ethoxylated (4) bisphenol A monomer | 36.60 wt. % |
| TPO photoinitiator | 1.05 wt. % |
| Irgacure184 photoinitiator | 1.05 wt. % |

Example 7—Oligomer Free Composition with a Flame Retardant

| | |
|---|---|
| 9Z1317 | 55.50 wt. % |
| Photomer 3016 epoxy diacrylate monomer (IGM Resins Inc.) | 5.80 wt. % |
| SR601/Photomer 4028 ethoxylated (4) bisphenol A monomer | 36.60 wt. % |
| TPO photoinitiator | 1.05 wt. % |
| Irgacure184 photoinitiator | 1.05 wt. % |
| Irganox1035 antioxidant | 0.38 pph |

Example 8—Oligomer Free Composition with a Flame Retardant

| | |
|---|---|
| 9Z1317 | 55.50 wt. % |
| Photomer 3016 epoxy diacrylate monomer | 5.80 wt. % |
| SR601/Photomer 4028 ethoxylated (4) bisphenol A monomer | 36.60 wt. % |
| TPO photoinitiator | 1.05 wt. % |
| Irgacure184 photoinitiator | 1.05 wt. % |
| Irganox1035 antioxidant | 0.38 pph |

As detailed above, Examples 2 and 4-8 include dispersions comprising a flame retardant material and at least one monomer. For example, Example 2 includes a dispersion of ATH in propoxylated neopentyl glycol diacrylate monomer and Example 4 includes a dispersion of $Mg(OH)_2$ in tripropylene glycol diacrylate monomer. The monomers contained in the dispersions are part of the monomeric component of embodiments of the composition.

Tables 1-3 demonstrate various properties of flame retardant compositions. The results shown in the Table 1 indicates that the cure speed of such coatings does not deteriorate with addition of flame retardant components; and the results presented in Table 2 show that LOI (Limiting Oxygen Index), is significantly higher then conventional coatings, for example, standard commercially available UV curable acrylates. Table 3 illustrates a range of mechanical properties that can be achieved using the FRC materials disclosed herein.

TABLE 1

Cure Speed and Percentage of Cure Shrinkage for Embodiments of Secondary Coating Compositions

| Example No. | Cure Speed |
|---|---|
| Comparative Example A | 165 ± 2 |
| 1 (Control for Ex. 3) | 179 ± 4 |
| 2 | 201 ± 3 |
| 3 | 213 ± 1 |
| 4 | 213 ± 4 |
| 5 | 174 ± 5 |
| 6 | 182 ± 14 |
| 7 | 168 ± 6 |
| 8 | 169 ± 4 |

TABLE 2

Flame Retardant Properties and RI of Coating Compositions

| Example No. | Limiting Oxygen Index | Refractive Index (RI) |
|---|---|---|
| 1 (Control for Ex. 3) | N/A | 1.5144 ± 0.0002 |
| 2 | 30.3 | 1.5396 ± 0.0006 |
| 3 | 28.9 | 1.5350 ± 0.0005 |
| 4 | 28.7 | 1.5266 ± 0.0002 |
| 5 | 22.0 | 1.5473 ± 0.0004 |
| 6 | 21.5 | 1.5495 ± 0.0003 |
| 7 | 21.6 | 1.5470 ± 0.0002 |
| 8 | 21.8 | 1.5488 ± 0.0003 |

TABLE 3

Mechanical Properties of Compositions (Cured Rods)

| Example No. | Young's Modulus (MPa) | Tensile Strength (MPa) | % Elongation at Break | DMA Tg (° C.) |
|---|---|---|---|---|
| Comp. Ex. A | 1320 ± 29 | 39.5 ± 1.2 | 13.9 ± 5.0 | 68.5 |
| 1 (Control for Ex. 3) | 1201.2 ± 27.2 | 40.1 ± 4.2 | 29.2 ± 3.5 | 55.24 |
| 2 | 1737.1 ± 142.8 | 29.2 ± 1.2 | 7.5 ± 1.7 | 51.23 |
| 3 | 2544.0 ± 170 | 35.9 ± 1.0 | 7.3 ± 1.7 | 56.9 |
| 4 | 2570.3 ± 72.1 | 42.5 ± 0.9 | 11.5 ± 1.8 | 56.45 |
| 5 | 1316 ± 23.9 | 32.9 ± 1.1 | 22.6 ± 2.4 | 53.8 |
| 6 | 1360.7 ± 62.6 | 37.5 ± 1.7 | 29 ± 3.5 | 52.2 |
| 7 | 1262.1 ± 26.9 | 31.1 ± 1.9 | 20.9 ± 4.2 | 53.2 |
| 8 | 1360.9 ± 46.7 | 38.3 ± 3.2 | 30 ± 5.1 | 50.1 |

Figure 1:
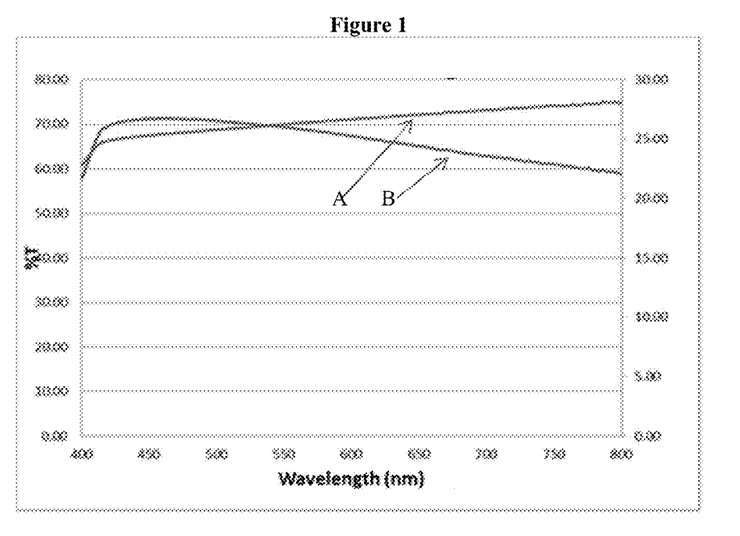
FIG. 1 is a graph illustrating the transmission spectra for back-reflected and transmitted light in the 400-800 nm range of an LDF having a 75 μm flame retardant coating layer according to the present disclosure.
Figure 2:
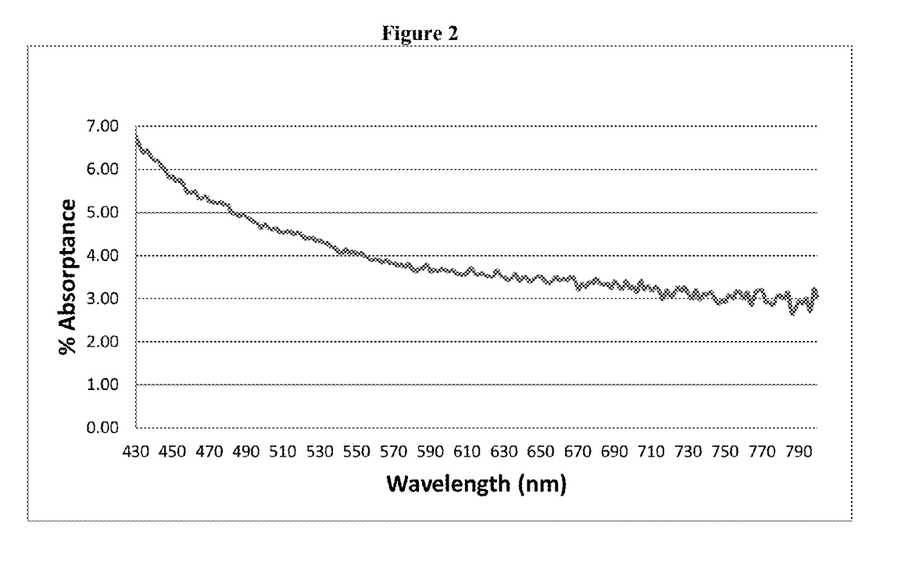
FIG. 2 is a graph illustrating the absorbance spectra (100-R-T), where R is reflectance, and T is transmission, of an LDF having a 75 μm flame retardant coating layer according to the present disclosure.
Figure 3:
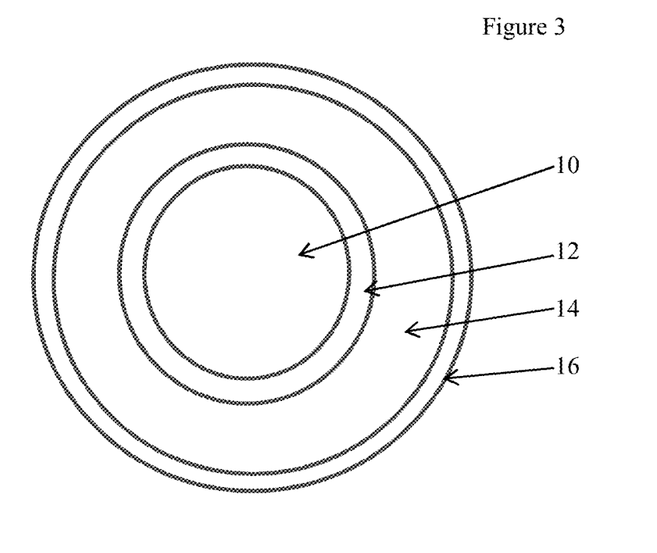
FIG. 3 is an illustration of an LDF as described in U.S. Patent Application Publication No. 2001-0122646.

The FRCs disclosed herein, due to their scattering and absorption properties as is shown in FIGS. 1 and 2, can replace two layers, the secondary clear coating and the white ink layer, in the LDFs illustrated in FIG. 3. FIG. 3 illustrates a prior art LDF having a glass fiber RAL core 10, a low refractive index primary coating/cladding 12 over the core 10, a secondary coating 14 over the primary coating 12 and a light diffusing layer 16 such as a white ink over the secondary coating 14. The importance of FIGS. 1 and 2 is to show that material has low absorption, i.e. no losses other than scattering. The line A in FIG. 1 is transmission, the line B is reflectance. The most important is FIG. 2, which shows absorbance (1-R-T), where R is reflectance, and T is transmittance. Its transmission is illustrated in FIG. 1 as line A. The fiber coated with the novel coating disclosed herein shows similar angular scattering performance as LDF of FIG. 3 with white ink (earlier application). The scattering properties of alumina particles in the FRC of the present disclosure are relatively small and hence are good enough to provide a uniform performance in angular space distributions in tests done at 450 and 532 nm wavelengths.

Figure 4:
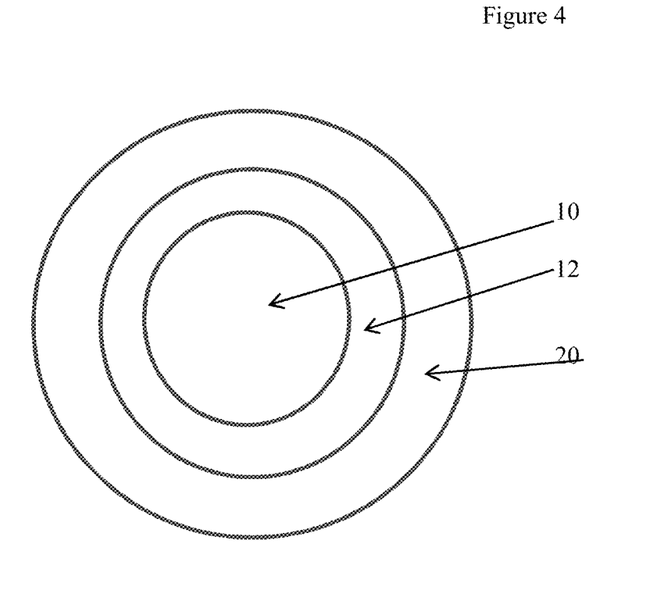
FIG. 4 is an illustration of an LDF of the present disclosure having a flame retardant coating layer and an optional phosphor coating layer.

FIG. 4 illustrates an embodiment of the disclosure comprising a glass RAL fiber 10 having a low refractive index polymer coating/cladding 12 over the fiber 10, and a flame retardant, light diffusing layer 20 over the polymer coating/cladding 12, the layer 20 being a flame retardant polymer layer containing at least one inorganic, halogen-free flame retardant filler as described herein.

Figure 5:
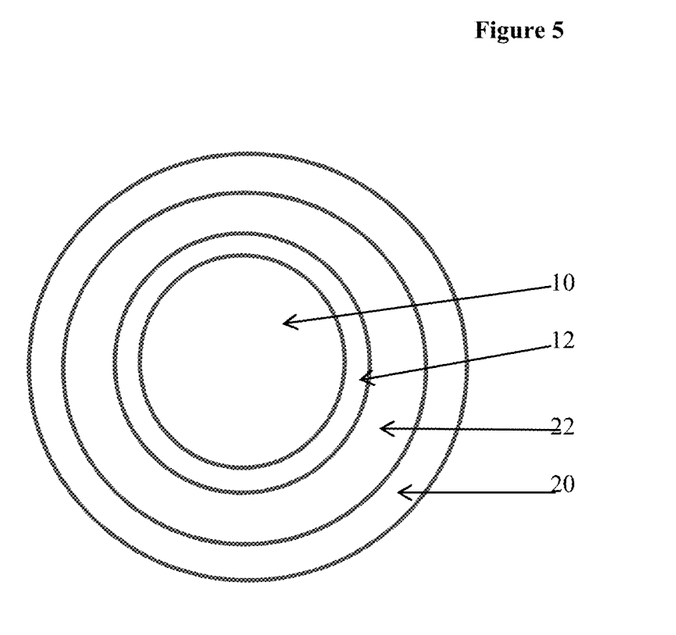
FIG. 5 is an illustration of an LDF of the present disclosure having a combined flame-retardant/phosphor coating layer.

FIG. 5 illustrates an embodiment of the disclosure comprising a glass RAL fiber 10 having a low refractive index polymer coating/cladding 12 over the fiber 10, a phosphor doped coating layer 22 over the polymer coating/cladding 12, and a flame retardant, light diffusing layer 20 over the phosphor doped coating layer 22, the layer 20 being a flame retardant polymer layer containing at least one inorganic, halogen-free flame retardant filler as described herein. The phosphor containing layer can be a polymer made from any clear polymer forming material(s) into which the phosphor can be dispersed. In one embodiments the polymer forming materials are the same polymer forming materials as are used to form the flame retardant coating, but without the inorganic filler.

Figure 6:
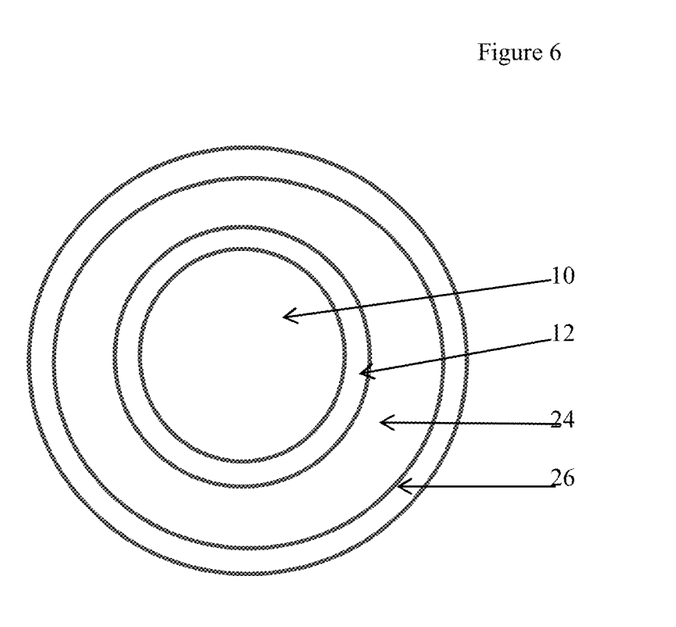
FIG. 6 illustrates an embodiment comprising a glass RAL fiber 10 having a low refractive index polymer coating/cladding 12 over the fiber 10; a phosphor doped, flame retardant coating layer 24 over the polymer coating/cladding 12, the phosphor being mixed with the flame retardant monomer composition containing the at least one inorganic, halogen-free flame retardant filler as described herein and applied as a coating layer 24.

FIG. 6 illustrates an embodiment comprising a glass RAL fiber 10 having a low refractive index polymer coating/cladding 12 over the fiber 10; a phosphor doped, flame retardant coating layer 24 over the polymer coating/cladding 12, the phosphor being mixed with the flame retardant monomer composition containing the at least one inorganic, halogen-free flame retardant filler as described herein and applied as a coating layer 24. FIG. 6 further illustrates an optional coating 26 which is a flame retardant coating as described herein containing the at least one inorganic, halogen-free flame retardant filler as described herein, but without the phosphor. The flame retardant coating 26 is applied over the phosphor containing flame retardant coating 24 and serves to protect the phosphors in coating 24 from atmospheric moisture while providing further flame retarding properties.

In the embodiments illustrated in FIGS. 4-6 the total thickness of the coating layer(s) 20, 22 plus 20, and 24 plus 26 can be less than or equal to the total thickness of layers 14 plus 16 in FIG. 3.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

We claim:

1. A flame retardant light diffusing fiber comprising:
   a glass fiber core, the fiber being a random airline fiber having openings within;
   a primary polymeric coating over the glass fiber core, the primary polymeric coating being clear and colorless and having a lower refractive index than the glass fiber core, and
   an optically transmissive flame retardant polymer coating over the primary polymeric coating, the optically transmissive flame retardant coating comprising 15-65 wt. % of an inorganic, halogen-free filler and 35-85 wt. % polymer;
   wherein the polymer of the optically transmissive flame retardant polymer coating is oligomer-free and is selected from the group consisting of:
   (a) an epoxy diacrylate monomer, ethoxylated (4) bisphenol A diacrylate monomer, propoxylated neopentyl glycol diacrylate monomer, and less than 3 wt. % polyether urethane acrylate oligomer,
   (b) an epoxy diacrylate monomer, ethoxylated (4) bisphenol A diacrylate monomer, tripropylene glycol diacrylate monomer, and less than 3 wt. % polyether urethane acrylate oligomer,
   (c) ethoxylated (4) bisphenol A diacrylate monomer, ethoxylated (10) Bisphenol A diacrylate monomer, tripropylene glycol diacrylate monomer, and acidic polymeric ester TrPGDA or (PO)NPGDA, and
   (d) mixtures thereof.

2. The flame retardant light diffusing fiber according to claim 1, wherein the optically transmissive flame retardant polymer coating comprises 25-65 wt. % of an inorganic, halogen-free filler and 35-75 wt. % polymer.

3. The flame retardant light diffusing fiber of claim 2, wherein the inorganic halogen-free filler is selected from the group consisting of aluminum trihydroxide and magnesium hydroxide, said filler having a particle size in the range of 0.05 µm to 5 µm.

4. The flame retardant light diffusing fiber of claim 2, wherein the inorganic halogen-free filler is selected from the group consisting of aluminum trihydroxide and magnesium hydroxide, said filler having a particle size in the range of 0.1 µm to 2 µm.

5. The flame retardant light diffusing fiber according to claim 1, wherein the limiting oxygen index of the optically transmissive flame retardant polymer coating is at least 21.

6. The flame retardant light diffusing fiber according to claim 1, wherein the limiting oxygen index of the optically transmissive flame retardant polymer coating is at least 28.

7. The flame retardant light diffusing fiber of claim 1, wherein the inorganic halogen-free filler is selected from the group consisting of aluminum trihydroxide and magnesium hydroxide, said filler having a particle size in the range of 0.05 µm to 5 µm.

8. The flame retardant light diffusing fiber of claim 1, further comprising a phosphor layer between the primary polymeric coating and the optically transmissive flame retardant polymer coating.

9. The flame retardant light diffusing fiber of claim 1, wherein the optically transmissive flame retardant polymer coating is structurally configured to permit 50% or more of light (i) propagating within the glass fiber core and (ii) comprising a wavelength between about 400 nm and about 800 nm to scatter outward from the glass fiber core and traverse through the optically transmissive flame retardant polymer coating.

10. The flame retardant light diffusing fiber of claim 1, wherein the optically transmissive flame retardant polymer coating further comprises a phosphor.

11. The flame retardant light diffusing fiber of claim 1, wherein the inorganic halogen-free filler is selected from the group consisting of aluminum trihydroxide and magnesium hydroxide, said filler having a particle size in the range of 0.1 µm to 2 µm.

* * * * *

UNITED STATES PATENT AND TRADEMARK OFFICE
CERTIFICATE OF CORRECTION

PATENT NO. : 9,720,157 B2
APPLICATION NO. : 13/975699
DATED : August 1, 2017
INVENTOR(S) : Inna Igorevna Kouzmina et al.

It is certified that error appears in the above-identified patent and that said Letters Patent is hereby corrected as shown below:

On the Title Page

Item [72], insert:
--Arpita Mitra, Big Flats, NY (US)--

Signed and Sealed this
Fourteenth Day of August, 2018

Andrei Iancu
*Director of the United States Patent and Trademark Office*